Jan. 9, 1968 P. CUMMINS 3,363,059

START-STOP COMMUNICATION SYSTEM FOR USE IN SPACE RESERVATION AND THE LIKE

Filed Sept. 20, 1963 7 Sheets-Sheet 4

INVENTOR
PETER CUMMINS

United States Patent Office 3,363,059
Patented Jan. 9, 1968

3,363,059

START-STOP COMMUNICATION SYSTEM FOR USE IN SPACE RESERVATION AND THE LIKE

Peter Cummins, Farnham, Surrey, England, assignor to William L. Paddison, London, England Filed Sept. 20, 1963, Ser. No. 310,281
7 Claims. (Cl. 178—53.1)

This invention relates to an information transmission system, and more particularly to a system by which it is possible to transmit information from a number of separate transmitting points to a central point, where the information received from each of the transmitting points is continuously available, for example, by being visually displayed, the transmissions of information taking place over the ordinary public telephone network.

It is often desirable to be able to transmit information from numerous transmitting points to a central point where the combined information may be used. One instance is in the case of a group of hotels, situated at widely different points, and a central establishment, for example, a booking centre, which requires to know how many single bedrooms, or double bedrooms, or double bedrooms with bath etc., are engaged and vacant. In such a case it is, of course, essential that the information available at the central establishment be kept completely up to date.

The invention will be described in its application to such an installation but it will, of course, be understood that it may equally well be applied to transmitting information on such matters as employment vacancies existing in different areas, car parking facilities available at different places, and many other spheres in which it is useful that a central station should have up to date information from numerous outlying points. While such systems, in themselves, are known, an important object of the invention is to provide a simple system in which the ordinary public telephone network may be used as the transmission path, the telephone lines concerned being useful for ordinary telephone purposes when not engaged in the information transmission process associated with the invention.

Another object of the invention is to provide an automatic information transmission system in which the information to be transmitted is first set up manually, and in which it is then only necessary to dial or otherwise call the receiving station and operate a transmit or start key, whereupon the information is transmitted and received automatically in a very short space of time.

A further object is to provide an automatic information transmission system in which a central receiving apparatus first identifies the particular transmitter which is operating, out of a number of possible transmitters, and then directs the information transmitted to an information store associated with the particular transmitter, the information being thereafter available for immediate access.

The invention consists of a system for transmitting information from a plurality of separate transmitters over transmission channels to a central receiver comprising means in each transmitter to produce automatically in timed sequence a start pulse, a group of address pulses identifying the transmitter, and a group of information pulses, the central receiver comprising a number of information stores equal to the number of transmitters, each information store being identified with one transmitter, means responsive to the start pulse from a transmitter to cause the receiver to commence operation, means responsive to the address pulses to select the information store identified with the transmitter, and means to route the information pulses to the selected information store. Conveniently each pulse consists of a burst of substantially sinusoidal alternating current waves maintained for a predetermined time and the coding of the address and the information is in accordance with a normal binary system. Preferably the duration of each address or information pulse is appreciably less than the time period allocated for the pulse, the pulse being transmitted in the middle part of the said time period with an unused "porch" period on each side of the pulse, whereby a slight mismatch in the frequencies of oscillators in the transmitter and receiver will not result in any loss of information.

Further description of the nature of the invention, and a selected exemplary embodiment thereof, will now be given with reference to the accompanying drawings, in which—

Figures 13, 14:
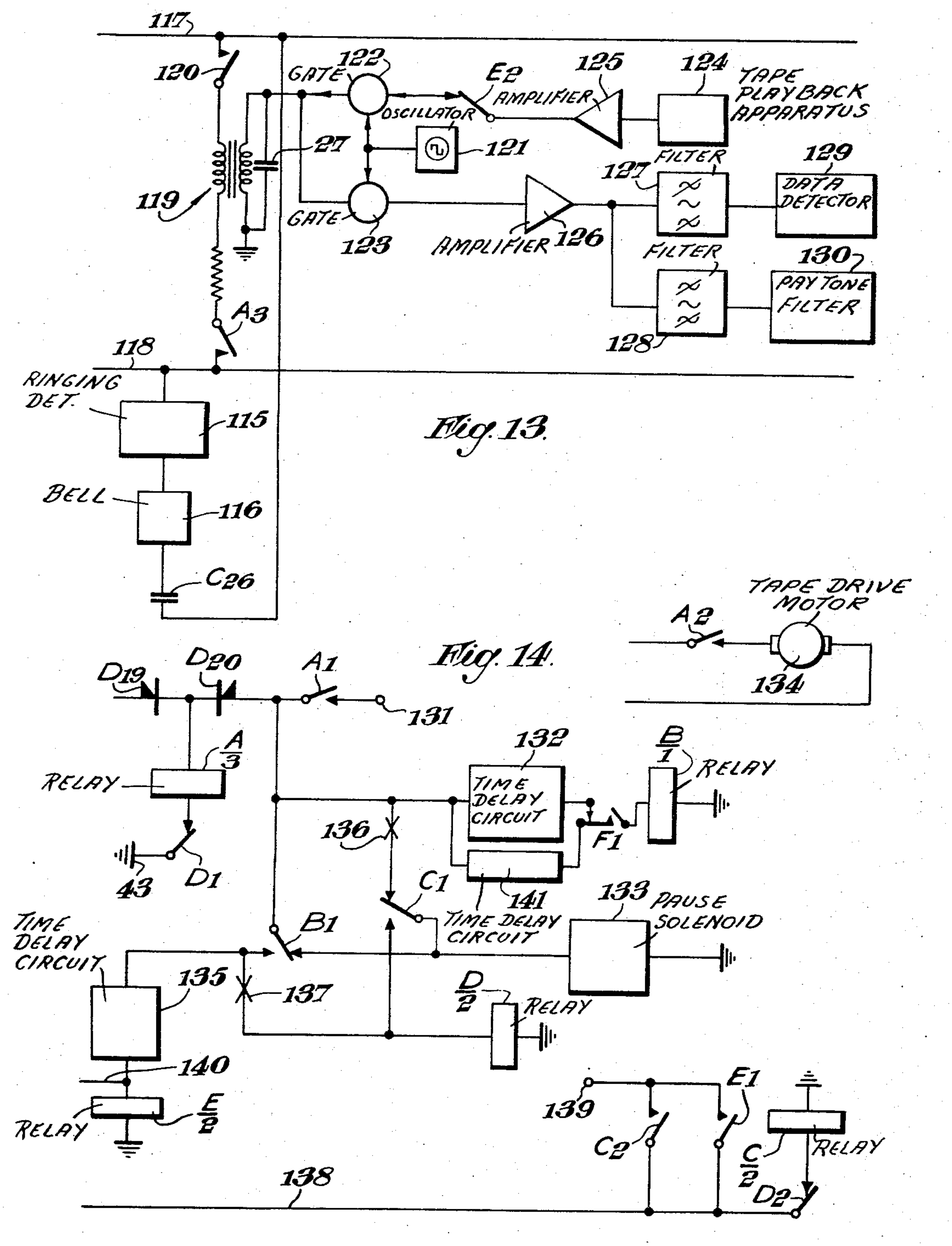
FIGURE 13 shows some of the receiving station automatic answering circuits, including devices necessary to comply with British Post Office regulations.

FIGURE 14 contains details of circuitry additional to that of FIGURE 13; and

Figure 15:
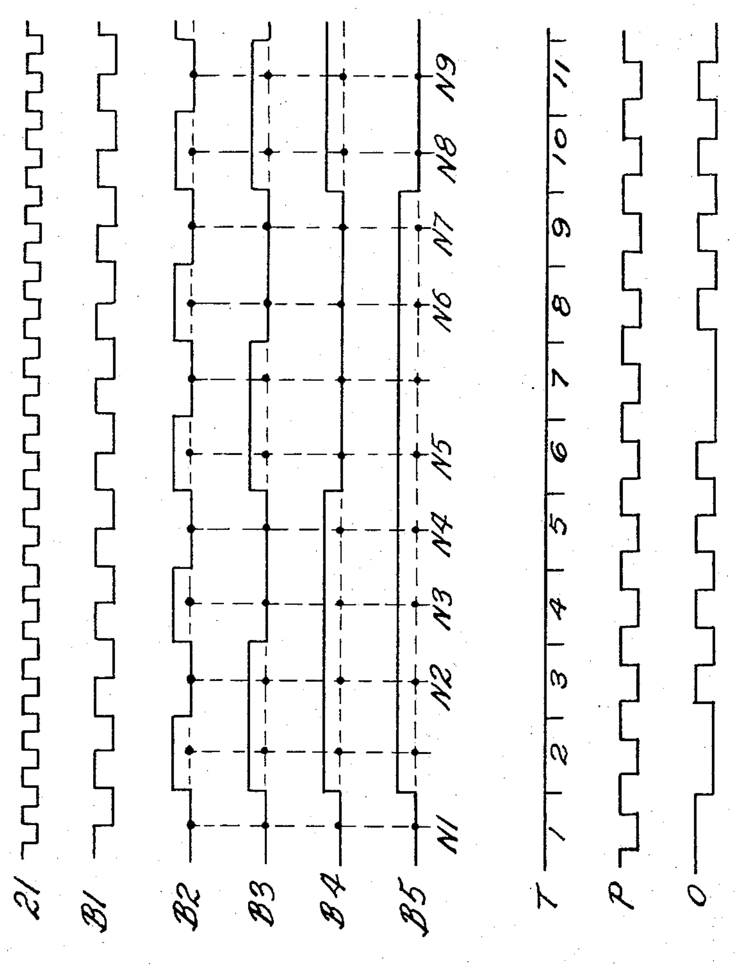

FIGURE 15 shows a series of pulse waveforms to explain how the sequential pulses are generated in each transmitter and in the receiver.

The embodiment of the invention to be described relates to a system for transmitting information as to bookings and vacancies for various kinds of room, i.e., single bedrooms, double bedrooms, double bedrooms with bath, etc., from each of a number of hotels, which may be distributed over a wide area, to a central receiving station, which may be at the offices of a company which owns and manages all the hotels and wishes to have up-to-date information as to the state of bookings, or at a central booking agency at which hotel accommodation may be reserved. The information is transmitted entirely over the ordinary telephone system and the transmission of the information itself is automatic. Each of the hotels must, of course, be provided with transmitting apparatus. At the central receiving station the information is received and is made available for access, for example, by arranging that information relating to each of the hotels is displayed on a separate display panel.

Figure 1:
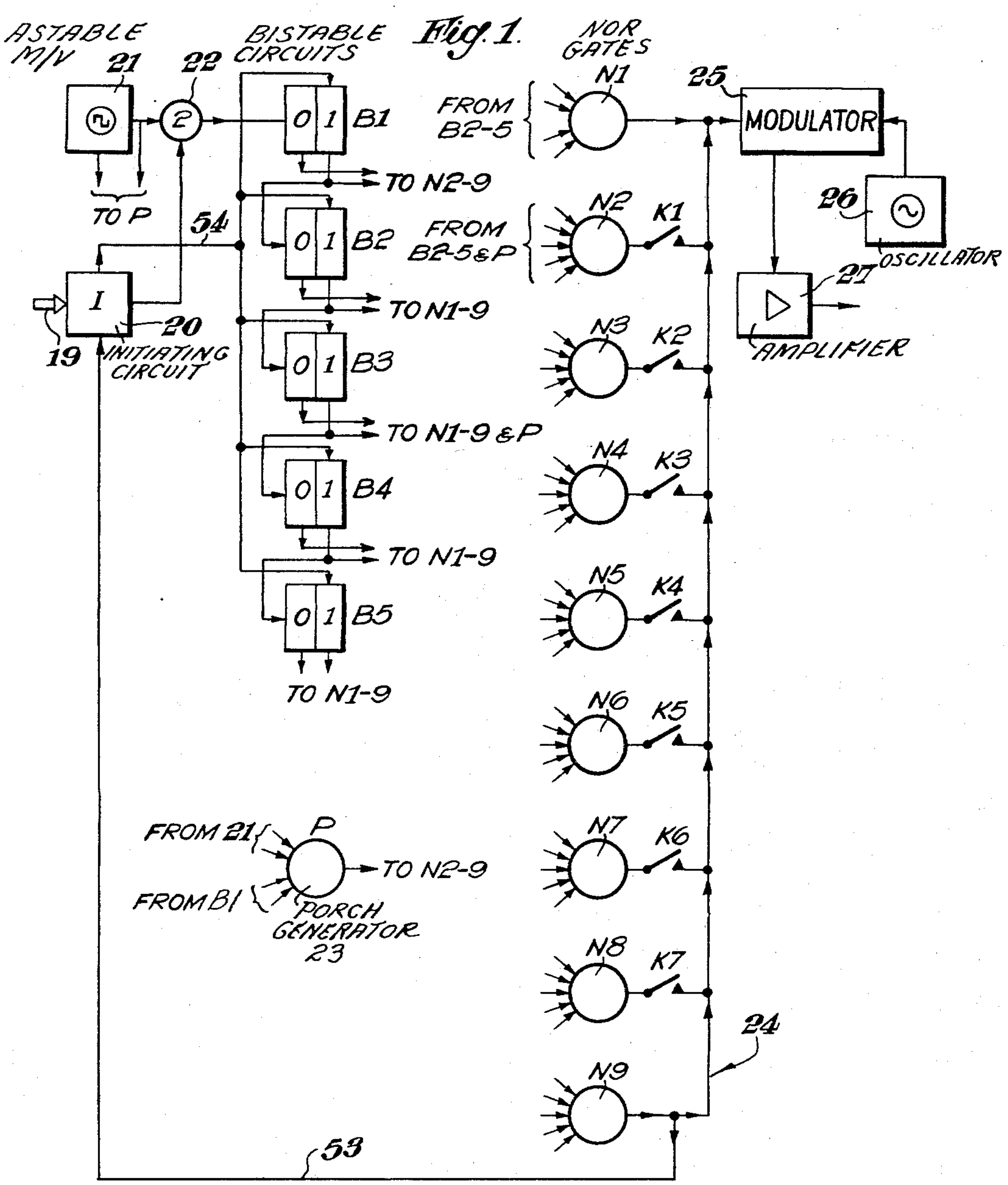
FIGURE 1 is a block schematic diagram of the transmitting equipment which is installed at each transmitting point.

The block schematic diagram of FIGURE 1 shows the transmitting apparatus. The first stage of operation is for a human operator to dial the telephone number of the central receiving station in the ordinary way. The operator then awaits an answering signal from the central receiving station and as soon as this arrives he operates a "start" or a "transmit" key 19 on the transmitting apparatus, which applies a pulse to an initiating circuit 20, shown in FIGURE 5. Thereafter the transmitter functions entirely on its own to transmit the information which has previously been set up on a suitable coding panel by the human operator, the information being of the kind described earlier. The transmitter co-operates with the receiver so that as soon as the whole of the information has been transmitted, the receiver automatically shuts down and the telephone circuit set up by the dialing operation is cleared down by the human operator at the transmitting station terminating the call in the usual way. In those telephone systems in which the called station controls the interconnecting telephone circuits (as opposed to the "calling-subscriber hold" system just described), the sequence just described will be slightly different in that the clearing down is automatically performed when the receiver apparatus is disconnected.

It is possible to transmit information by allowing different signal amplitudes to represent different quantities or items of information but in view of the variation in attenuation likely to be encountered in ordinary telephone lines and the noise which may be present on the lines, it is only practicable to use two levels, i.e., an "on" level in which a signal is being transmitted and an "off" level in which no signal is being transmitted, which leads naturally to the adoption of a binary system for coding the information, in which a pulse corresponds to a "1" and the absence of a pulse in a particular time period indicates a zero, or vice versa. In the following description it will be assumed that a pulse indicates a 1 and the absence of a pulse in an alloted time period indicates a zero.

According to the regulations of the British Post Office relating to the use of telephone lines for purposes other than pure telephony, it is forbidden to feed direct current signals into the lines and the pulses must therefore consist of bursts of an alternating current signal, such as a tone signal of a particular frequency, maintained for a predetermined time period. The said regulations specify the characteristics of non-vocal signals which may be transmitted over telephone lines. The ordinary telephone line will transmit freguencies up to about 3 kc./s. and for the purpose of the present invention a frequency of 1.6 kc./s. is a convenient modulating frequency, so that the pulses each consist of a burst of a tone signal at a frequency of 1.6 kc./s. maintained for a predetermined time. It will, of course, be understood that if the invention is being used in another country, or in circumstances in which the British Post Office regulations do not apply, other arrangements may be made within the scope of the invention, by using different frequencies or pulse durations or even transmitting direct current pulses.

Figure 2:
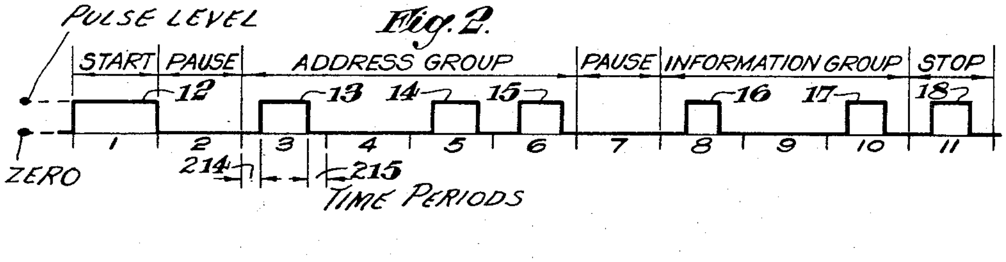
FIGURE 2 is a diagram showing the sequence of transmission of the pulses which are sent from each transmitting point to the central receiving point.

Operation of the "transmit" key by the operator causes a group of coded impulses to be sent over the telephone circuit from the transmitter to the receiver, and a typical pulse transmission sequence is shown in FIGURE 2. As shown in that figure, the pulse train is divided into eleven time periods, numbered 1 to 11. The first period (time period 1) is occupied by a start pulse 12. Thereafter there is a pause during time period 2, when no signal is being transmitted. During the next four time periods (time periods 3 to 6) a group of up to four pulses is transmitted. In order to allow for a slight difference between the frequencies of two oscillators respectively at the transmitting and receiving end, to be described more particularly at a later stage, the address group pulses transmitted in the third to sixth time periods are each shorter in duration than the time periods allowed so that, for example, the pulses 13, 14 and 15 are shorter in duration than the time period 3 and there are equal "porch" periods 214 and 215 on either side of the actual pulse. This will be more particularly discussed later. The address information identifies the particular transmission point from which the information is being transmitted and is coded according to a binary system. Since up to four pulses may be transmitted the number of different transmitting stations which can be identified is a maximum of $2^4$, that is to say, 16, but since it is preferred not to use the "0000" code as an identification signal, the number of addresses is restricted to 15. This means that the system, as described, may be used to transmit information as to bookings etc., from 15 different hotels to the central receiving station. If this number is insufficient it is, of course, possible to modify the system so that five address group time periods are allowed and then up to five address pulses may be transmitted, when the total number of different codes available will be 32, or 31 useful codes if the 00000 combination is omitted. From this explanation it will be obvious that the transmission system according to the invention may be expanded to cover any desired number of transmitting stations.

Following the address group transmission in time periods 3 to 6, there is a pause during the period 7, after which a group of information pulses is transmitted. As shown in FIGURE 2, there are three periods 8, 9 and 10, during each of which one pulse may be transmitted, and by binary coding this will enable up to eight different combinations to be transmitted, or seven useful combinations if the 000 combination is omitted. In this case also, the amount of information, that is to say, the number of different code combinations available, may be increased to any desired extent by merely allowing additional time periods, so that a greater number of pulses may be transmitted. Each of the pulses transmitted in the time periods 8, 9 and 10 is of shorter duration than the time periods themselves and as exemplified by the pulses 16 and 17 transmitted respectively in the 8th and 10th time periods, the pulses being centrally placed in time with respect to the periods by providing the "porch" periods on either side of the pulses, as previously described.

Following the information group of pulses a "stop" pulse 18 is transmitted in the 11th time period shown in FIGURE 2, to indicate that the transmitted message has ended.

The apparatus shown in FIGURE 1 comprises an astable multivibrator 21 which produces a square wave signal and this is passed through a gate 22 when that gate is opened by a start signal supplied by the initiating circuit 20 in response to the pressing of the transmit key 19. The gate 22 is of conventional type and needs no description.

Figure 3:
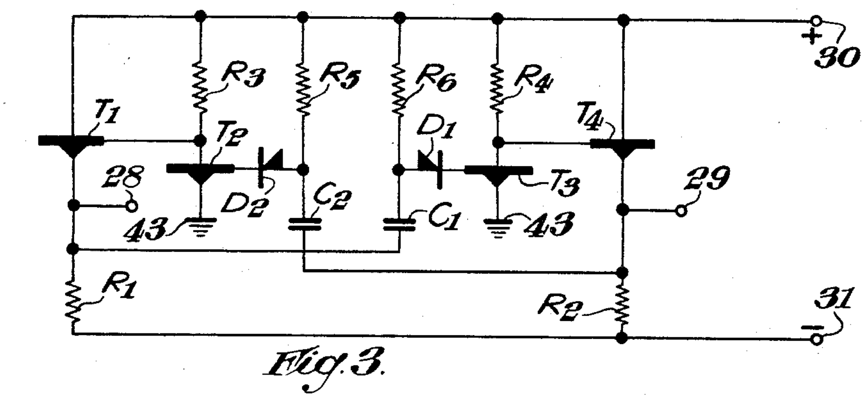
FIGURE 3 is a circuit of a multivibrator adapted for use in the transmitting and receiving equipment according to the invention.

FIGURE 3 is a circuit diagram of the astable multivibrator 21, which comprises four transistors $T_1$, $T_2$, $T_3$ and $T_4$. The transistors are all of the n-p-n type.

In a practical version of the circuit all the transistors may be Texas type 2S701; both diodes may be Texas type 1S120; resistors $R_3$ and $R_4$ may be 3.3K ohms; resistors $R_5$ and $R_6$ may be 47 ohms; resistors $R_1$ and $R_2$ may be 68K ohms; capacitors $C_1$ and $C_2$ may be 0.1$\mu$ F.; the terminals 30 and 31 may be respectively 7 volts positive and 7 volts negative with respect to the ground potential 43.

The square wave signal from the multivibrator 21 is fed to the first of a chain of divider circuits $B_1$ to $B_5$, which are bistable circuits and may be of a conventional type, and in which a single input is applied to the two input points of each bistable circuit through two diodes, one of which is always reverse biased, depending upon the instantaneous state of the circuit, so that successive input pulses cause the circuit to make successive changes from one state to the other. The outputs of the bistable divider circuits are connected to NOR gates $N_1$ to $N_9$ in combinations such that these gates successively produce output pulses in the sequence shown in FIGURE 2, the time periods corresponding to half-cycles of the divider circuit $B_2$. At the same time as the signals are being applied from the circuits $B_2$ to $B_5$ to the NOR gates $N_1$ to $N_9$ a porch generator P has fed into it pulses from the multivibrator 21 and from the divider circuit $B_1$ in such a manner as to generate pulses of shorter duration than the individual time periods, and appropriately placed in time within each time period, to produce the effect indicated in FIGURE 2 in which the duration of the pulse 13 is shortened by the porch periods 214 and 215 on either side of it.

The manner in which the multivibrator 21 and the bistable divider circuits $B_2$ to $B_5$ function to produce the desired sequential pulses at the NOR gates $N_1$ to $N_9$ will be understood by reference to FIGURE 15. In that figure a series of lines of pulses is shown in relation to the time periods 1 to 11. A NOR gate produces an output signal only when no signal is present at any of its inputs.

In FIGURE 15 the upper line of pulses having the legend "21" at its left-hand end illustrates the pulses provided by the astable multivibrator 21. The next five lines of pulses labelled in descending order $B_1$ to $B_5$ show the pulse outputs of the five bistable divider circuits in relation to the output of the multivibrator. A line labelled "T" at its left-hand end indicates the time periods 1 to 11 and provides a time base for the whole of the lines of pulses of FIGURE 15. The line of pulses labelled "P" indicates the output of the porch generator while the line of pulses labelled "O" indicates the output of the NOR gates $N_1$ to $N_9$. Thus, the line "O" indicates the pulses available for application to a modulator 25 if all the keys $K_1$ to $K_7$ of FIGURE 1 are closed.

The pulses of the multivibrator 21 successively trigger the first divider circuit $B_1$, which in turn successively triggers the second divider circuit $B_2$ and so on. All the divider circuits are substantially symmetrical elements which provide two outputs, one or other of which is "high" at any given time, while the remaining output is low. For convenience one output is labelled "1" in FIGURE 1 and the other is labelled "0," but clearly when the "1" output of any circuit is at low level (i.e. its output is zero) then its "0" output must be at high level. The "1" outputs of circuits $B_2$ to $B_5$ are indicated in solid lines in FIGURE 15, while the periods in which the "0" outputs are at low level are indicated by dotted lines.

Initially the four divider circuits $B_2$ to $B_5$ are all at low level, having previously been set, as will be described later. Divider circuit $B_1$ is also set at low level but this is not material to the present discussion. The NOR gate $N_1$ is connected to the four "1" outputs of $B_2$ to $B_5$ which, in time period 1, are all at low level. These connections are denoted by dots on the "1" output lines of $B_2$ to $B_5$ joined by a vertical dotted line leading to the symbol "$N_1$." Consequently, no inhibiting signal is applied to any input of the NOR gate $N_1$ in time period 1 and its output is at high level throughout this time period. This is the start pulse. NOR gate $N_1$ is not affected by the output of the porch generator P since there is no connection from P to $N_1$.

At the end of time period 1 the multivibrator 21 switches divider circuit $B_1$ so that its "1" output goes to high level. This high level is applied to the input of divider circuit $B_2$ which is also set to produce a high level output at its "1" terminal. This, in turn, switches circuit $B_3$, and so on. Consequently at the beginning of time period 2 the "1" terminals of $B_2$ to $B_5$ are all at high level and the "0" terminals of $B_2$ to $B_5$ are all at low level. Time period 2 is a pause period and no output is required. If a NOR gate were connected to the four "0" output terminals of $B_2$ to $B_5$, that NOR gate would produce an output signal during time period 2. However, since no output is required during this pause period no NOR circuit is connected to all four of the "0" output terminals of $B_2$ to $B_5$.

During time period 3 the "1" output of $B_2$ is at low level while the "1" outputs of $B_3$, $B_4$ and $B_5$ are at high level. Therefore, NOR gate $N_2$ is connected to the "1" output terminal of $B_2$ and to the "0" output terminals of $B_3$, $B_4$ and $B_5$. Consequently, during time period 3 NOR gate $N_2$ produces an output pulse which (if $K_1$ is closed) is applied to modulator 25. During time period 4 the "1" outputs of $B_2$, $B_4$ and $B_5$ are at high level while the "1" output of $B_3$ is at low level, and NOR gate $N_3$ is connected to the "1" output of $B_3$ and to the "0" outputs of $B_2$, $B_4$ and $B_5$. During time period 4 NOR gate $N_3$ receives no input signals from the divider circuits and accordingly it produces an output pulse.

The combination of connections from the divider circuits to each individual NOR gate is unique, so that each NOR gate only produces an output during its allotted time period. It should be noted that no NOR gates are connected to the combinations of $B_2$ to $B_5$ outputs which would produce NOR gate output pulses during time periods 2 and 7 because these are pause periods when no output is ever required.

The connections from the bistable divider circuits $B_2$ to $B_5$ to the NOR gates $N_1$ to $N_9$ are set out in the table appearing below and from this the general sequence of these connections may be seen. From the sequence shown in the table the manner in which the table may be extended to cover the maximum number of sixteen unique combinations which the four divider circuits $B_2$ to $B_5$ can provide is obvious.

TABLE.—CONNECTIONS OF NOR CIRCUITS $N_1$–$N_9$ TO BISTABLE DIVIDERS $B_2$–$B_5$

| Time Period | NOR Circuit | $B_2$ | $B_3$ | $B_4$ | $B_5$ |
|---|---|---|---|---|---|
| 1 | $N_1$ | 1 | 1 | 1 | 1 |
| 2 | | 0 | 0 | 0 | 0 |
| 3 | $N_2$ | 1 | 0 | 0 | 0 |
| 4 | $N_3$ | 0 | 1 | 0 | 0 |
| 5 | $N_4$ | 1 | 1 | 0 | 0 |
| 6 | $N_5$ | 0 | 0 | 1 | 0 |
| 7 | | 1 | 0 | 1 | 0 |
| 8 | $N_6$ | 0 | 1 | 1 | 0 |
| 9 | $N_7$ | 1 | 1 | 1 | 0 |
| 10 | $N_8$ | 0 | 0 | 0 | 1 |
| 11 | $N_9$ | 1 | 0 | 0 | 1 |

The porch generator P is fed with pulses from the multivibrator 21 and divider circuit $B_1$ and it is so arranged that when 21 and $B_1$ are both at high level or both at low level it produces no output, while during the half-cycles of 21 when one is at high level and the other is at low level, the porch generator produces an output, and since the porch generator is connected to each of the NOR gates $N_2$ to $N_9$ the output from these NOR gates is restricted to the central part of the respective time period when the porch generator is producing no output.

The same pattern of connections is followed in relation to a multivibrator, divider circuits and NOR gates in the receiver. The frequency of the multivibrator in the receiver, and the associated divider circuits, define similar time periods, and to allow for any slight difference in the frequencies of the two multivibrators, and to make quite sure that a pulse occurring in one time period of the transmitter cannot partly register in the succeeding time period or the preceding time period of the receiver, the duration of the pulse at the transmitter is restricted by the porch periods, as described. This ensures that the pulses in the respective time periods of the transmitter are always correctly recognized by the receiver. The output from the porch generator P is fed to the NOR circuits $N_2$ to $N_9$ but not to the NOR circuit $N_1$ because the start pulse, during time period 1, is not shortened, as is evident from FIGURE 2.

Figures 4, 5:
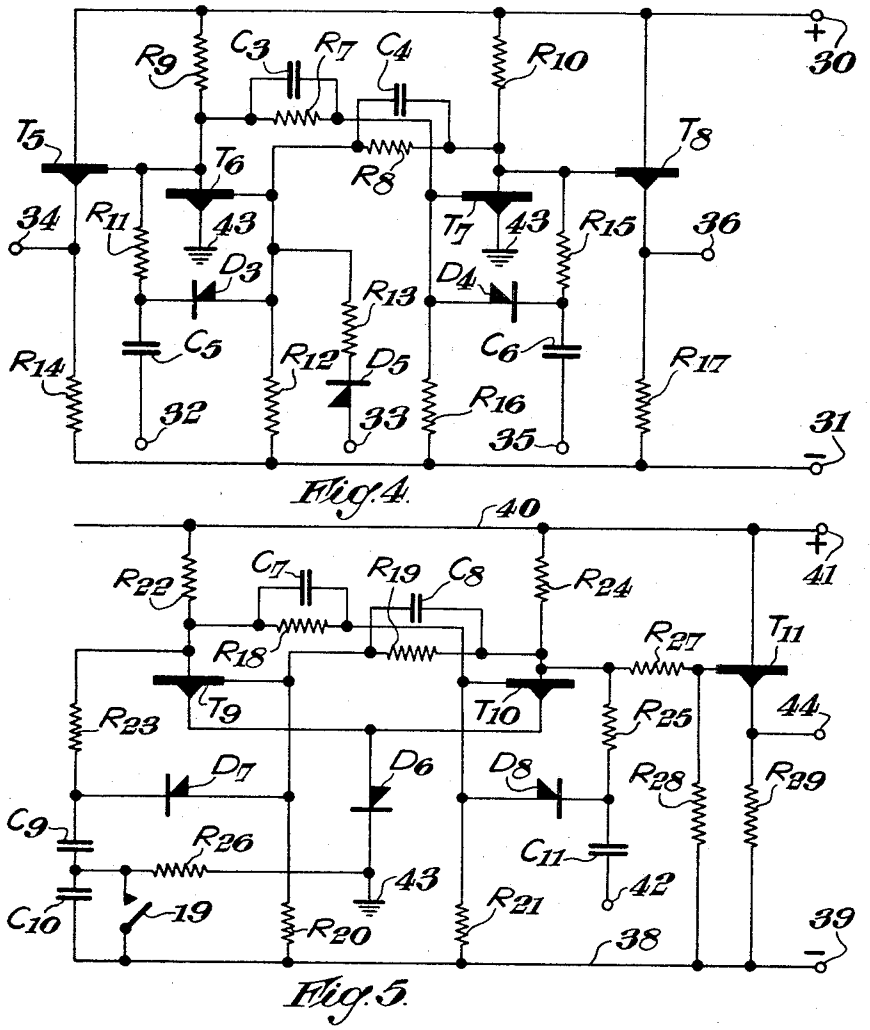
FIGURE 4 is a bistable divider circuit.
FIGURE 5 is an initiating circuit.

FIGURE 4 shows the circuitry of one of the bistable dividers $B_1$ to $B_5$. Each of these elements comprises four transistors $T_5$, $T_6$, $T_7$ and $T_8$ which are also of the n-p-n type, the two transistors $T_6$ and $T_7$ being coupled in a manner similar to those of the multivibrator but using D.C. couplings $R_7$ and $R_8$ respectively coupling the collector of each transistor to the base of the other, so that the pair of transistors forms a bistable device.

As will be explained in detail later, a re-set pulse is applied to the terminals 33 of all the divider circuits at the end of the transmission so that all the circuits are set to the desired state in readiness for the next transmission. In a practical circuit transistors $T_5$ to $T_8$ may be Texas type 2S701; the diodes may be Texas type 1S120; resistors $R_9$ and $R_{10}$ may be 3.3K ohms; resistors $R_{11}$ and $R_{15}$ may be 10K ohms; resistor $R_{13}$ may be 15K ohms; resistors $R_7$ and $R_8$ may be 22K ohms; resistors $R_{12}$ and $R_{16}$ may be 68K ohms; resistors $R_{14}$ and $R_{17}$ may be 100K ohms; capacitors $C_3$ and $C_4$ may be 100 pf.; capacitors $C_5$ and $C_6$ may be 220 pf.; and the power supply voltages may be plus and minus 7 volts.

Referring back to FIGURE 1, the interconnection between the bistable divider circuits and the NOR circuits $N_1$ to $N_9$ is such that the NOR circuits successively produce pulses at their output terminals. NOR circuit $N_1$ produces a pulse which, not being controlled by the porch circuit P, exists for the full duration of the time period 1 (FIGURE 2), and this pulse is applied to a common line 24 (FIGURE 1) which is connected to the modulator 25. After time period 1 there is a pause, as shown in FIGURE 2, and during time period 3 NOR circuit $N_2$ produces a pulse which, however, is of shorter duration since it is restricted by the porch periods at each end. The succeeding NOR circuits produce pulses during successive time periods but the pulses produced by NOR circuits $N_2$ to $N_8$ are only applied to the common line 24 if the keys $K_1$ to $K_7$ are closed. These keys correspond to the key 51 shown in FIGURE 6. The keys K are manually set by each transmitter operator. Keys $K_1$ to $K_4$ are permanently pre-set in the open or closed position so that the pulses emanating therefrom in the particular time periods provide the unique combination of pulses which represents the address of the transmitting station. Keys $K_5$ to $K_7$ are set by the operator prior to each transmission in the code which represents the information to be transmitted.

It will be noted that in FIGURE 2 there is an unoccupied time period 7 between the address group and the information group of pulses. This period is used in the receiver to enable the address decoding equipment therein to select the required display equipment before receipt of the actual display information. In a system in which the time periods are long (e.g. 50 milliseconds or more) this pause period 7 would be unnecessary.

The successive pulses from the NOR circuits are all fed to the common line 24 and thence to the modulator 25, which also receives a modulating frequency from an oscillator 26. The oscillator 26 produces a substantially sinusoidal wave having the selected frequency of 1.6 kc./s. The output of the modulator 25 therefore consists of bursts of 1.6 kc./s. tone signals in the time periods determined by the pulses emanating from the NOR circuits $N_1$ to $N_9$. The output of the modulator 25 is fed to an amplifier 27 from which the modified pulse signals are fed to the transmission line, which is the combination of lines set up as the result of dialling the receiver number.

The initiating circuit 20 of FIGURE 1 is illustrated in FIGURE 5 and comprises a pair of transistors $T_9$ and $T_{10}$ connected in a bistable circuit configuration. The "start" or "transmit" key 19 has one terminal connected to the negative line 38 and the other terminal connected to the junction of capacitors $C_9$ and $C_{10}$ and also through a resistor $R_{26}$ to the ground potential 43, so that closure of the "transmit" key causes the negative potential of the line 38 to be applied through resistor $R_{26}$ and diode $D_6$ to the emitter of transistor $T_9$ to place the circuit in one of its stable states. On the other hand, a stop pulse applied to the terminal 42 is transmitted through capacitor $C_{11}$ and diode $D_8$ to the base of transistor $T_{10}$ to set the circuit to its other stable state. The collector of transistor $T_{10}$ is connected through a resistor $R_{27}$ to the base of a third transistor $T_{11}$, which base is also connected through a resistor $R_{28}$ to the negative supply line 38. The emitter of transistor $T_{11}$ is connected through a resistor $R_{29}$ to the negative line 39 and the said emitter is also connected to an output terminal 44. The transistor $T_{11}$ functions as an emitter follower and the signal at the output terminal 44 is a re-set signal which is either at high level (for re-setting) or at low level with respect to the negative potential on the line 38, depending upon the state of the bistable circuit comprising transistors $T_9$ and $T_{10}$.

The operation of the circuit will be referred to in more detail later.

In a practical embodiment of the circuit the transistors $T_9$, $T_{10}$ and $T_{11}$ may all be Texas type 2S701; diodes $D_6$, $D_7$ and $D_8$ may all be Texas type 1S120; resistors $R_{22}$, $R_{24}$ and $R_{27}$ may be 3.3K ohms; resistors $R_{23}$ and $R_{25}$ may be 10K ohms; resistors $R_{18}$ and $R_{19}$ may be 22K ohms; resistors $R_{20}$ and $R_{21}$ may be 68K ohms; resistors $R_{26}$, $R_{28}$ and $R_{29}$ may be 100K ohms; capacitors $C_7$, $C_8$, $C_9$, $C_{10}$ and $C_{11}$ may all be of 100 pf. capacitance. The potentials applied to the terminals 41 and 39 may be respectively 7 volts positive and 7 volts negative with respect to the median ground potential 43.

Figure 6:
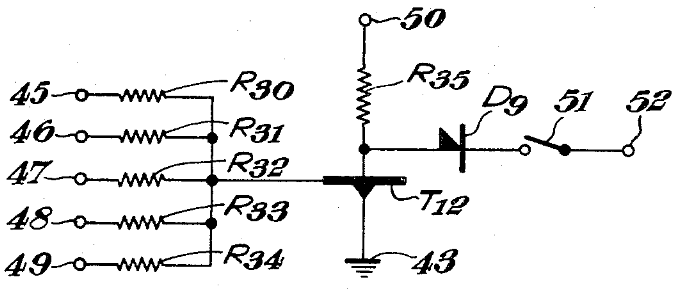
FIGURE 6 is a NOR circuit.

FIGURE 6 shows the NOR circuit which is employed in the positions $N_1$ to $N_9$ in FIGURE 1. The NOR circuit shown in FIGURE 6 has five input terminals, respectively 45 to 49. The NOR circuits $N_2$ to $N_9$ of FIGURE 1 all have five inputs, but the NOR circuit $N_1$ differs in that it only has four inputs and the alteration simply involves leaving out one of the input terminals 45 to 49 and one of the input resistors, respectively $R_{30}$ to $R_{34}$, which are connected to the input terminals. The other ends of the resistors $R_{30}$ to $R_{34}$ are connected to the base of a transistor $T_{12}$ having its emitter connected to the ground potential 43 and having its collector connected through a resistor $R_{35}$ to a positive terminal 50. The collector of transistor $T_{12}$ is connected through a diode $D_9$ to one terminal of a key 51, the other terminal of which provides the output at point 52.

The NOR circuit generates an output signal whenever *no* input signal is present. Thus it will generate a pulse which commences when all the input signals at the terminals 45 to 49 are removed and will end when an input signal is applied to any one of the input terminals.

In a practical version of this circuit the transistor $T_{12}$ may be Texas type 2S701; the diode $D_9$ may be Texas type 1S120; resistor $R_{35}$ 3.3K ohms; resistors $R_{30}$ to $R_{34}$ may each be 24K ohms; and the potential applied to terminal 50 may be 7 volts positive with respect to the ground potential 43.

Figure 7:
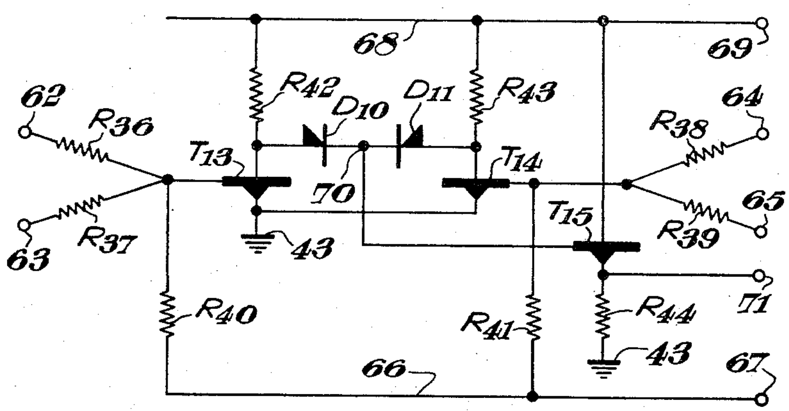
FIGURE 7 is a porch generator circuit.

FIGURE 7 shows the circuit of the porch generator P of FIGURE 1, which is responsible for producing the narrow pulses 13 to 18 shown in FIGURE 2, and leaving the unoccupied time periods 214 and 215 on either side of the pulses within the total time period allowed. It comprises two transistors $T_{13}$ and $T_{14}$ having their emitters connected together and to the ground potential 43. Two input terminals 62 and 63 are provided which are respectively connected through resistors $R_{36}$ and $R_{37}$ to the base of transistor $T_{13}$. Two further input terminals, 64 and 65 are connected respectively through resistors $R_{38}$ and $R_{39}$ to the base of transistor $T_{14}$. The collector of transistor $T_{13}$ is connected through diode $D_{10}$ to a junction point 70 and the collector of transistor $T_{14}$ is connected through another diode $D_{11}$ to the same junction point. The junction point 70 is connected to the base of a further transistor $T_{15}$. The collector of transistor $T_{15}$ is connected to the positive line 68 while the emitter of transistor $T_{15}$ is connected through a resistor $R_{44}$ to the ground level 43. Transistor $T_{15}$ is an emitter follower and the output is taken from its emitter to terminal 71.

One output of the multivibrator 21 (FIGURE 3) from terminal 28, is applied to terminal 62 and the other output of multivibrator 21, from terminal 29, is applied to terminal 64. One output of the bistable divider $B_3$ (FIGURE 4), from terminal 34, is applied to terminal 63 while the other output of the bistable divider, from terminal 36, is applied to input terminal 65.

If only the multivibrator were operating, the bases of transistors $T_{13}$ and $T_{14}$ would alternately conduct. Due to the diodes $D_{10}$ and $D_{11}$, whichever transistor is conducting would communicate its potential through the respective diode to the junction 70 and to the base of transistor $T_{15}$, which would conduct continuously, so that the output terminal 71 would always be at high level with respect to the negative line 66. If only the multivibrator connections were broken and only the bistable divider were operating the same thing would occur. With both in operation, the two input square waves are out of phase with each other, due to the delays in switching described in connection with FIGURE 4. In consequence there are periods at the beginning and end of each half-wave where one of the transistors $T_{13}$ and $T_{14}$ is held non-conducting by the multivibrator and the other is held non-conducting by the bistable divider. These periods are the porch periods which were previously discussed and are indicated by references 214 and 215 in FIGURE 2.

In its practical form transistors $T_{13}$, $T_{14}$ and $T_{15}$ may be of Texas 2S701 type, these being n-p-n transistors, as previously mentioned; diodes $D_{10}$ and $D_{11}$ may be of Texas 1S120 type; resistors $R_{42}$ and $R_{43}$ may be of 3.3K ohms; resistors $R_{36}$, $R_{37}$, $R_{38}$ and $R_{39}$ may be of 24K ohms; resistors $R_{40}$ and $R_{41}$ may be of 220K ohms and resistor $R_{44}$ may be of 100K ohms; potentials applied respectively to terminals 69 and 67 may be 7 volts positive and 7 volts negative with respect to the median ground level 43.

Figure 8:
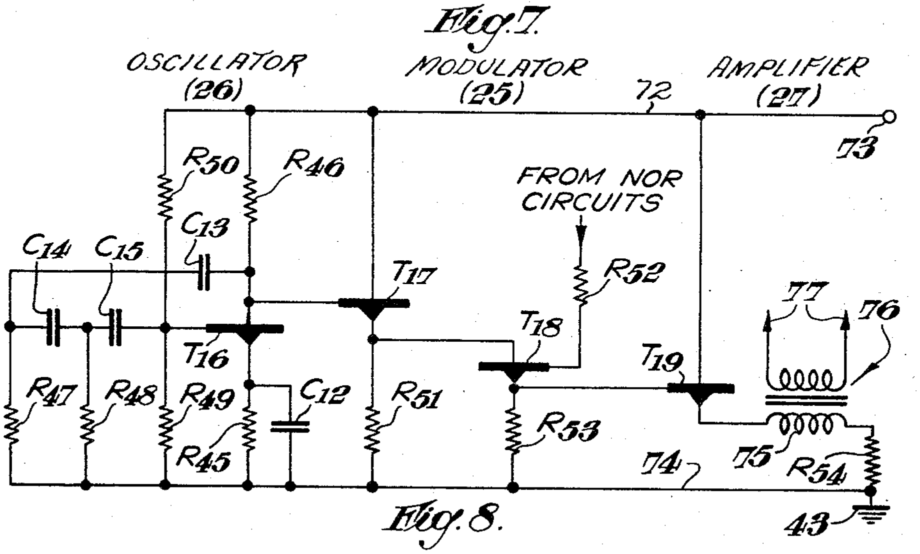
FIGURE 8 shows the circuit of an oscillator, modulator and transmission amplifier.

FIGURE 8 is the circuit of the oscillator 26, followed by the modulator 25 and the transmission amplifier 27. The oscillator comprises a transistor $T_{16}$ having its emitter connected through a resistor $R_{45}$ to the ground point 43, the resistor $R_{45}$ being decoupled by a capacitor $C_{12}$. The collector of transistor $T_{16}$ is connected through a resistor $R_{46}$ to a positive supply line 72 connected to a positive terminal 73. A feedback to cause the transistor $T_{16}$ to oscillate is provided by a capacitor $C_{13}$ connected through a resistor $R_{47}$ to a ground line 74, and the junction of capacitor $C_{13}$ and resistor $R_{47}$ is connected to one terminal of a further capacitor $C_{14}$ whose other terminal is connected to one terminal of a third capacitor $C_{15}$ and also through a resistor $R_{48}$ to the ground line 74. The other terminal of capacitor $C_{15}$ is connected to the base of transistor $T_{16}$ and through a resistor $R_{49}$ to the ground line 74, and also through a resistor $R_{50}$ to a positive supply line 72 connected to terminal 73. The collector of transistor $T_{16}$ is connected to the base of a transistor $T_{17}$ whose collector is connected directly to the positive supply line 72 and whose emitter is connected through a resistor $R_{51}$ to the ground line 74 and also directly to the collector of the modulator transistor $T_{18}$. The signal from the NOR circuits on the line 24 of FIGURE 1 is applied to the base of transistor $T_{18}$ through a resistor $R_{52}$. The emitter of transistor $T_{18}$ is connected through a resistor $R_{53}$ to the ground line 74 and is also connected directly to the base of a transmission amplifier transistor $T_{19}$ having its collector connected directly to the positive supply line 72 and having its emitter connected through the primary winding 75 of a transformer, indicated generally by reference 76, in series with a resistor 54, to the ground line 74. The transformer 76 is an impedance matching transformer and the two secondary leads 77 are connected to the telephone transmission line.

In operation the transistor $T_{16}$ oscillates at a predetermined frequency which, as previously mentioned, may conveniently be 1.6 kc./s. The oscillations are applied to the base of transistor $T_{17}$, which functions as an emitter follower, and the output is applied to the collector of transistor $T_{18}$. The signal from the NOR circuits causes transistor $T_{18}$ to be made in turn conductive and nonconductive and the output, consisting of bursts of oscillations which form the pulses controlled by the NOR circuits, are applied to the base of transistor $T_{19}$, the output being taken from its emitter circuit through the transformer 76 to the transmission line. In the practical form of this circuit the transistors $T_{16}$ to $T_{19}$ may all be Texas type 2S103; resistor $R_{54}$ may be 600K ohms; resistor $R_{46}$ may be 3.3K ohms; resistors $R_{47}$, $R_{48}$ and $R_{49}$ may be 4.7K ohms; resistor $R_{50}$ may be 9.1K ohms; resistor $R_{53}$ may be 10K ohms; resistor $R_{45}$ may be 1.2K ohms; resistor $R_{51}$ may be 22K ohms; resistor $R_{52}$ may be 52K ohms; capacitors $C_{13}$, $C_{14}$ and $C_{15}$ may be 0.01 mf. and capacitor $C_{12}$ may be 2 mf.

A complete operating cycle of the transmitter is as follows. When the human operator presses the transmitting key 19 the initiating circuit 20 provides a signal which opens gate 22. The multivibrator 21, which is in operation (or may if desired be switched on by the initiating circuit 20) transmits a square wave signal through the gate to the first stage $B_1$ of the bistable divider group, which is changed over to its other state by the first half-cycle. Upon changing over, circuit $B_1$ transmits a signal to circuit $B_2$. Each time a bistable unit changes to the 1 state the output pulse produced triggers the following bistable unit. The trains of pulses produced by the bistable units are all submultiples of the multivibrator frequency, so that when combined in the NOR circuits $N_{1-9}$ they can produce the successive pulses mentioned earlier. The porch circuit P transmits pulses to NOR circuits $N_2$ to $N_9$ to ensure that the pulses from these circuits are of narrower width than the time period allowed, as previously explained, and since the narrower pulse is not required for NOR circuit $N_1$ it does not receive a signal from the porch circuit P. The interconnection between the divider circuits $B_1$ to $B_5$, the porch circuit P and the NOR circuits $N_1$ to $N_9$ are such that during one half-cycle of $B_2$ (which defines the first period 1 in FIGURE 2) the NOR circuit $N_1$ delivers a pulse to the common line 24 and thence to the modulator 25. The modulator 25 during the period of this pulse passes oscillations from the sinusoidal oscillator 26 to the amplifier 27 for transmission. The next half-cycle of $B_2$ is a rest period and during the next succeeding half-cycle of $B_2$ NOR circuit $N_2$ delivers a pulse which is restricted in time by the porch circuit P. This pulse is only transmitted to the common line 24 if the key $K_1$ is closed. If it is closed, then the pulse is applied to the modulator 25, which passes another burst of oscillations from oscillator 26 to amplifier 27 for transmission. If key $K_1$ is open, then the modulator 25 remains inoperative. This sequence is continued for NOR circuits $N_3$ to $N_9$. The address of the transmitting station is permanently set up by closing the appropriate ones of keys $K_1$ to $K_4$ and the information to be transmitted at a particular transmission is set up by closure of appropriate keys $K_5$ to $K_7$ immediately preceding the transmission. These keys $K_5$ to $K_7$ are, of course, selected by the human operator. The final pulse transmitted by NOR circuit $N_9$ is not subject to control, by a key, being the stop pulse which it is desired to transmit in all cases. There is also a connection from NOR circuit $N_9$ back to the initiating circuit 20, so that the stop pulse transmitted over the transmission line is also applied via line 53 to the initiating circuit 20 at terminal 42 in FIGURE 5 to change back the initiating circuit to its original quiescent state. The change-over of the initiating circuit causes the gate 22 to be closed and also applies a reset signal from terminal 44 of FIGURE 5 via line 54 to all the divider circuits $B_1$ to $B_5$ to reset them to the state required at the commencement of the next transmission.

Figure 9:
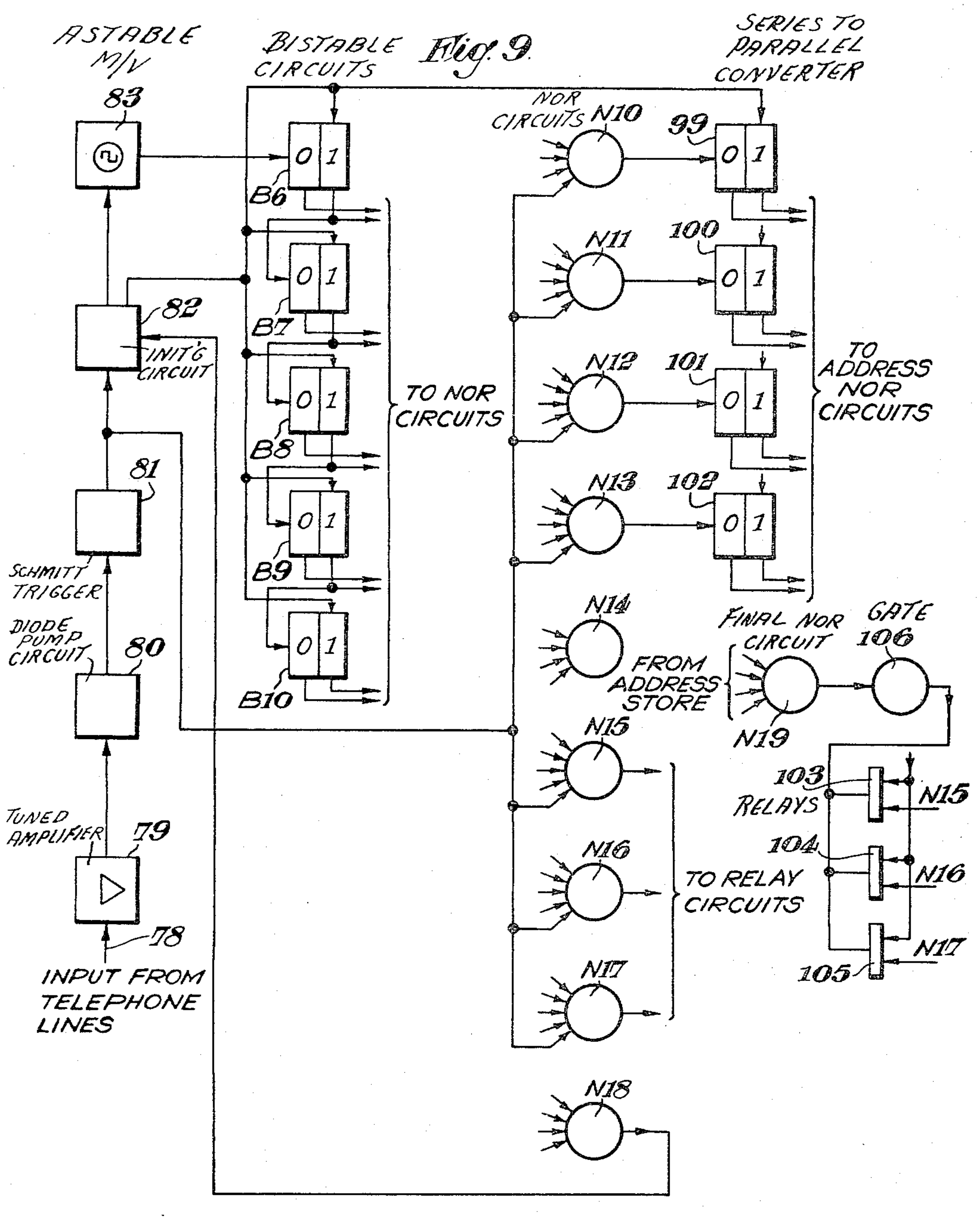
FIGURE 9 is a block schematic circuit of the receiver installed at the central receiving point.

FIGURE 9 is a block schematic diagram of the receiving apparatus. As shown in that figure, the input from the transmission line is received on an input line 78 and is applied to a tuned amplifier 79 and thence to a diode-pump circuit 80 followed by a Schmitt trigger circuit 81. The circuitry of these three units is shown in FIGURE 10.

Figures 10, 11, 12:
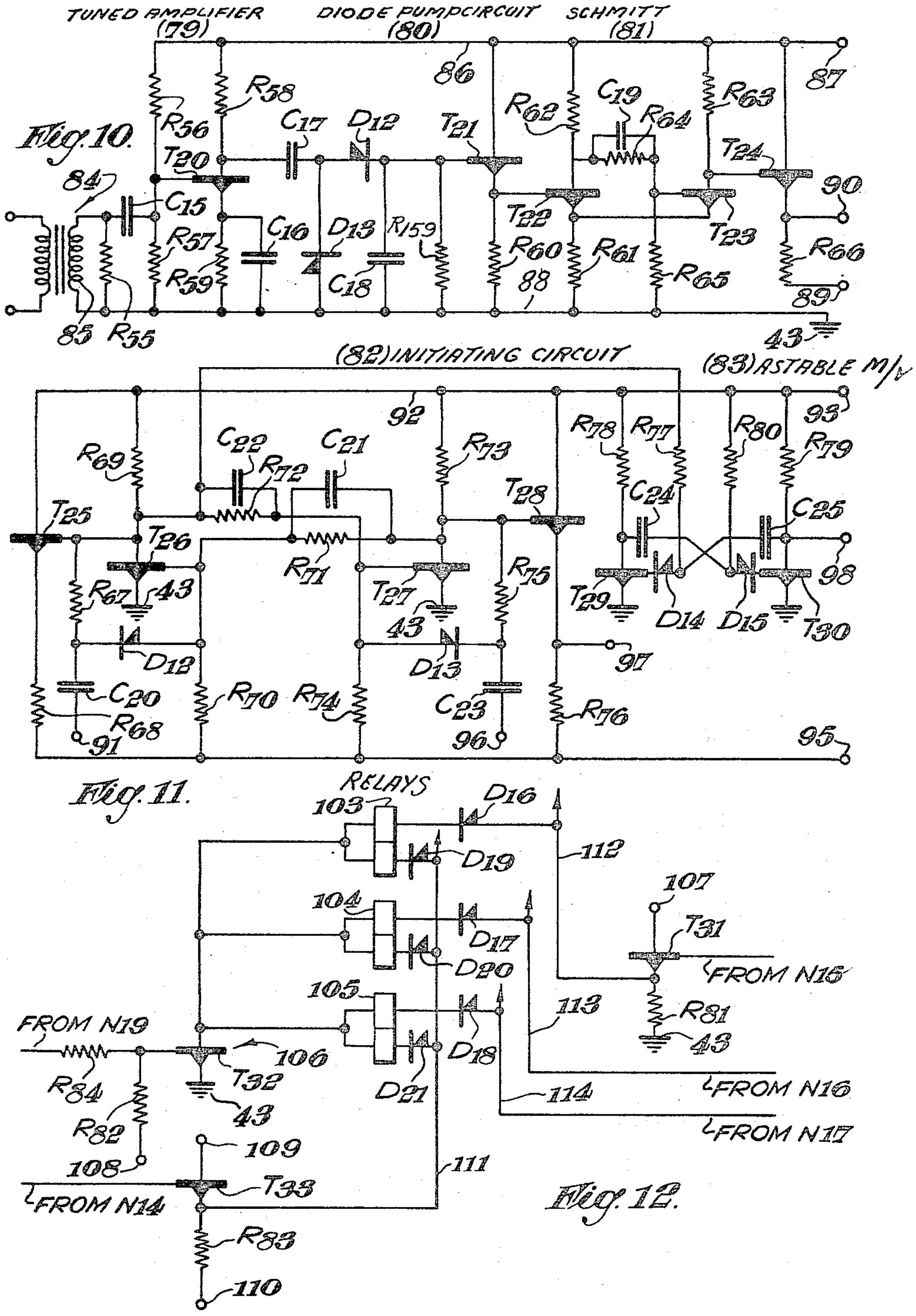
FIGURE 10 shows the receiver detecting circuits.
FIGURE 11 shows the initiating circuit and multivibrator circuit of the receiving equipment.
FIGURE 12 shows the gate and relay circuit of the receiving equipment.

Referring to FIGURE 10, the input signals received over the telephone lines are applied to the primary winding of a tuned input transformer 84. Connected across the secondary winding 85 of this transformer is an impedance matching resistor $R_{55}$, and one end of the secondary winding 85 is connected through a capacitor $C_{15}$ to the base of a transistor $T_{20}$. The transistor acts as a voltage amplifier while the capacitor $C_{15}$ is so chosen that, in conjunction with the reactance of transformer 85, it resonates substantially at the 1.6 kc./s. frequency of the bursts of pulses.

The output from the collector of transistor $T_{20}$ is fed through a capacitor $C_{17}$ to the junction of two diodes, $D_{12}$ and $D_{13}$, connected in series between the base of a transistor $T_{21}$ and the ground line 88. Also connected between the base of transistor $T_{21}$ and the ground line 88 are a further capacitor $C_{18}$ and a leak resistor $R_{159}$. The collector of transistor $T_{21}$ is connected to the positive supply line 86 and the emitter thereof is connected through a resistor $R_{60}$ to the ground line 88.

In operation, when the first train of 1.6 kc./s. pulses is received, i.e., the start pulse, these pulses are amplified in transistor $T_{20}$ and through the diodes $D_{12}$ and $D_{13}$ a voltage is built up on the capacitor $C_{18}$ which, after a predetermined number of cycles of the 1.6 kc./s. frequency, is sufficient to make transistor $T_{21}$ conduct. The output of transistor $T_{21}$, which is an emitter follower, is taken from its emitter to the base of the first transistor $T_{22}$ of the Schmitt trigger 81.

The second transistor comprised in the Schmitt trigger is transistor $T_{23}$. As is well known, the Schmitt trigger is a bistable device which is in one of its states when an input voltage applied to it is below a certain level and which changes to its other state when the input voltage rises above this level. In this particular arrangement the first few cycles of the burst of oscillations which make up the first (start) pulse build up the base voltage of transistor $T_{21}$ sufficiently to cause that transistor to conduct, and this also raises the voltage drop across resistor $R_{60}$ so that the voltage applied to the base of transistor $T_{22}$ is sufficient to cause the trigger to turn over to its other state. The output of the Schmitt trigger is taken from the collector of transistor $T_{23}$ to the base of a further transistor $T_{24}$, which is an emitter follower having its collector connected directly to the positive supply line 86 and having its emitter connected through a resistor $R_{66}$ to a terminal 89 which is connected to the negative power supply line previously referred to. The output is taken from the emitter of transistor $T_{24}$ to an output terminal 90.

In the practical form of the circuitry of FIGURE 10, the transistors $T_{20}$ to $T_{24}$ may be Texas type 2S103; the diodes $D_{12}$ and $D_{13}$ may be Texas type 1S120; resistor $R_{61}$ may be 390 ohms; resistor $R_{55}$ may be 600 ohms; resistor $R_{159}$ may be 1.8K ohms; resistor $R_{58}$ may be 3K ohms; resistors $R_{62}$ and $R_{63}$ may be 3.3K ohms; resistor $R_{57}$ may be 5.6K ohms; resistor $R_{60}$ may be 10K ohms; resistor $R_{56}$ may be 13K ohms; resistor $R_{64}$ may be 22K ohms; resistor $R_{66}$ may be 47K ohms; resistor $R_{65}$ may be 68K ohms; resistor $R_{59}$ may be 330K ohms; capacitor $C_{19}$ may be 220 pf.; capacitors $C_{15}$, $C_{17}$ and $C_{18}$ may be 0.02 $\mu$f.; and capacitor $C_{16}$ may be 2 $\mu$f.

The object in counting a definite number (which need only be three or four) of cycles before the receiver is actuated by incoming pulses is to guard against false operation resulting from noise or odd spurious pulses on the telephone lines. The output from the Schmitt trigger 81 consists of D.C. pulses which are a replica of the pulses at the output of the NOR circuits of the transmitter.

The output of the Schmitt trigger is directed to an initiating circuit 82 and to a series of NOR circuits $N_{10}$ to $N_{13}$ and $N_{15}$ to $N_{17}$. The NOR circuits are identical with that described with reference to FIGURE 6 while the initiating circuit is shown in FIGURE 11 and will now be described. The circuitry of FIGURE 11 includes an astable multivibrator 83 (FIGURE 9) which is adapted to operate at precisely the same frequency as the multivibrator 21 of FIGURE 1, and a bistable circuit (consisting of transistors $T_{25}$, $T_{26}$, $T_{27}$ and $T_{28}$), which is triggered by incoming "start" and "stop" pulses, applied to points 91 and 96 respectively.

When the Schmitt trigger circuit 81 changes over and produces its output signal on terminal 90 (FIGURE 10) this signal is supplied to start terminal 91 of the initiating circuit and sets it to its other state. This causes a signal to be transmitted from the collector of transistor $T_{26}$ to the base of transistor $T_{29}$ which starts the multivibrator 83 in operation, the multivibrator output being derived from a terminal 98. This output is applied to a bistable divider composed of circuits $B_6$ to $B_{10}$ and of the same configuration as the bistable divider circuits $B_1$ to $B_5$ (FIGURE 4), and they operate in exactly the same way to supply signals to the NOR circuits $N_{10}$ to $N_{13}$ and $N_{15}$ to $N_{17}$.

With the multivibrator 83 in operation the pulses occurring in time periods 3, 4, 5 and 6 of FIGURE 2 actuate NOR circuits $N_{10}$, $N_{11}$, $N_{12}$ and $N_{13}$ respectively in successive order, and the outputs of the NOR circuits are applied to an address store.

In the embodiment being described it is assumed that each of the information stores contains an information panel in which figures are illuminated to display the information from the time it is set up until it is cut off and changed by the next information transmission. Access can therefore be had to the transmitted information immediately at any time by merely looking at the display panel.

Since the received pulses occur sequentially it is necessary to provide a serial to parallel converter connected to the outputs of the address NOR circuits. This converter remembers the four sequential outputs from the four NOR circuits $N_{10}$ to $N_{13}$ so that the complete address can be recognized after the fourth pulse. The serial to parallel converter consists of four bistable circuits which may be similar to those used in the divider chain and previously described and are shown at 99 to 102 in FIGURE 9. The outputs from the converter are fed into another set of NOR circuits. There are as many of these NOR circuits as there are separate addresses in the system and each is associated with one display panel and only one NOR circuit will give an output for each unique binary address. One of these final NOR circuits, $N_{19}$, is shown in FIGURE 9, together with the associated relays 103, 104, and 105, and a gate 106. They will be more particularly described in connection with FIGURE 12. Thus after the address pulses have been received one NOR circuit operates and alerts one group of relays in the selected display panel. In the particular system being described polarized twin coil relays are used, each containing a permanent magnet to hold the relay in the operated condition once it has been operated, one coil acting as the operating coil and the other acting as the reset coil, i.e., to release the relay against the pull of the permanent magnet.

The next pulse arriving over the input line 78 (in time period 7 of FIGURE 2) is directed to a NOR circuit $N_{14}$ which delivers a signal to reset the display panel to cancel out the information currently being shown by the information store which has been selected by the address NOR circuits. This NOR circuit $N_{14}$ may be operated automatically, since the address has been completely received and recognized, or it could be actuated by a pulse transmitted during the time period 7, which pulse would be included in every transmission, like the start and stop pulses transmitted during time periods 1 and 11.

FIGURE 12 shows in more detail the relay circuit of one display panel, containing the three relays 103, 104 and 105. The pulse from NOR circuit $N_{15}$ is passed to an emitter follower transistor $T_{31}$ having its collector connected directly to a positive supply terminal 107 and having its emitter connected through a resistor $R_{81}$ to the ground potential 43. The signal from the emitter of $T_{31}$ is taken through a diode $D_{16}$ to the operating coil of relay 103 and to the operating coils of the corresponding relays of all the other display panels. In the same way, emitter followers (not shown) associated with NOR circuits $N_{16}$ and $N_{17}$ respectively pass signals through diodes $D_{17}$ and $D_{18}$ to the operating coils of respective relays 104 and 105 and to the operating coils of corresponding relays in all the other display panels.

When the address of the display panel associated with NOR circuit $N_{19}$, gate 106 and relays 103, 104 and 105 is selected the signal from $N_{19}$ is applied through a resistor $R_{84}$, to the base of a transistor $T_{32}$, which constitutes the gate 106. Transistor $T_{32}$ has its emitter connected to the ground potential 43 and has its collector connected to the return wires from the operating coils and the reset coils of all the relays. The base of transistor $T_{32}$ is connected through a resistor $R_{82}$ to a negative power supply terminal 108. Thus, in the absence of a signal from the NOR circuit $N_{19}$ the transistor $T_{32}$ is cut off, so that effectively the return circuits of all the relay coils are broken, but when the address of the display panel associated with the relays 103 to 105 is selected, transistor $T_{32}$ is made conductive and all the relay coils become operative.

The NOR circuit $N_{14}$ is connected to the base of a further transistor $T_{33}$ having its collector connected to a positive supply terminal 109 and having its emitter connected through a resistor $R_{83}$ to a negative supply terminal 110. A line 111 from the emitter of transistor $T_{32}$ is connected through respective diodes $D_{19}$, $D_{20}$ and $D_{21}$ to the reset coils of relays 103, 104 and 105, and also through similar diodes to the reset coils of all the relays associated with the other, non-selected, display panels.

In operation the transistor $T_{32}$ is made conductive by the signal applied to its base through resistor $R_{84}$ from NOR circuit $N_{19}$ when the address of the particular display panel is selected and this completes the return circuits from the operating coils and the reset coils of the relays associated with that particular display panel. The reset pulse which appears immediately afterwards on the line 111 is applied to the reset coils of all the relays in all the display panels, but since the return circuits are only completed in the selected display panel only the relays in the selected panel are reset. Similarly, the pulses from the NOR circuits $N_{15}$, $N_{16}$ and $N_{17}$ are applied to the respective operating coils of the relays in all the display panels but again only those in the selected display panel are operated, since the return circuits are only completed in the selected display panel.

In a practical version of the circuit of FIGURE 12 the transistors may all be Texas type 2S103; the diodes may all be Texas type 1S120; resistors $R_{81}$ and $R_{83}$ may be 4.7K ohms; resistor $R_{84}$ may be 11K ohms; and resistor $R_{82}$ may be 100K ohms.

One important feature of the transmission system according to the invention is as follows. It is, of course, possible to vary the length of the time periods 1 to 11 over a large range, but it is quite possible so to arrange the system that the transmission and changing of the displayed information is completed in less than one quarter of a second, including the time required to reset and re-operate the relays according to the new information which has been transmitted.

The final pulse, that is, the stop pulse transmitted in time period 11, FIGURE 2, is applied to NOR circuit $N_{18}$ and the output pulse from this circuit is transmitted to the stop terminal 96 of the initiating circuit 82 illustrated in FIGURE 11. This causes the initiating circuit 82 to revert to its initial state, thereby switching off the multivibrator 83 and also delivering a reset signal from terminal 96, which is applied to the reset terminals of all the bistable divider circuits $B_6$ to $B_{10}$ (at terminal 33 of FIGURE 4) so that these are all reset to their correct states for the receipt of the next following transmission.

In devising a system of this nature, which is to be connected to the public telephone network, it is necessary to comply with certain requirements of the British Post Office, which controls the telephone network. Some of these requirements have already been mentioned and others will now be referred to. It will, of course, be understood that these requirements may not necessarily apply in other countries, and they would not necessarily apply if a transmission channel other than the public telephone network were being employed. One of the requirements is that, in equipment of this nature, it is necessary to incorporate automatic answering equipment in the receiving station. This consists essentially of a continuous loop magnetic tape playback system, a relay switching system and a send/receive switching system. The circuitry necessary for this apparatus is shown in FIGURE 13 in block schematic form. A ringing detector 115 is connected in series with the normal telephone bell circuit across the signal wires, the bell being indicated by reference 116 and being in series with a capacitor $C_{26}$, the signal wires being indicated by references 117 and 118. A transformer 119 is also connected across the signal wires in series with a relay contact $A_3$, which will be more particularly referred to later, and an isolating switch 120, which is a standard Post Office isolating switch.

The transformer 119 presents the correct impedance to the transmission lines, as laid down in the Post Office specification. An oscillator 121 generates a high frequency (e.g. 10 kc./s.) square wave signal which is used to open the gates 122 and 123 alternately. These two gates respectively connect the receiving and transmitting portions of the circuitry of FIGURE 13 to the secondary winding of the transformer 119. Thus only half of this circuitry can be connected to the transformer 119 at any one time thereby eliminating "singing" or other forms of feedback oscillation. The frequency of the square wave signal generated by the oscillator 121 should be at least twice as high as the maximum signal frequency which has to pass through the gates, and to prevent any of the switching signal, that is, the square wave signal, from being fed to the transmission lines, a capacitor $C_{27}$ is connected across the secondary winding of transformer 119.

The automatic answering signals as specified by the Post Office are pre-recorded on a continuous loop of magnetic tape and the operation of the equipment will now be described.

In FIGURE 13 the tape playback apparatus 124 represents the transmitting part of the circuitry, the speech frequency signals being passed through an amplifier 125 and through relay contacts $E_2$ before arriving at the gate 122.

The received signals, after passing through the gate 123 are fed to an amplifier 126 and thence to two filters, respectively 127 and 128. Filter 127 passes only those frequencies associated with the data which, as described earlier, is a sinusoidal signal of 1.6 kc./s. frequency, and the data signals go to a data detector 129. Filter 128 passes only those frequencies associated with "pay tone" and these go to a pay-tone detector 130. "Pay tone" is a series of tones transmitted to a caller in a public telephone booth to tell him that the call to the number he dialled has been established and must now insert the appropriate coin in the coin box, after which he may begin his conversation.

Assume now that the receiving station telephone number has been correctly dialled by a transmitting station and a ringing signal is passed to the Post Office bell equipment. After about three seconds the ringing detector 115 operates and passes a D.C. voltage to relay A via a diode $D_{19}$ (FIGURE 14). The ringing detector 115 (FIGURE 13) may be a frequency-sensitive circuit of the diode pump variety similar to that described in connection with FIGURE 10. Relay A has three contacts. Contact $A_1$ (FIGURE 14) completes a holding circuit by passing a current from a positive supply terminal 131 through a diode $D_{20}$, relay coil A and a cotact $D_1$ to the ground potential point 43. Contact $A_2$ completes the circuit of the driving motor 134 of the tape playback apparatus 124, while contact $A_3$ previously referred to, connects the transformer 119 of FIGURE 13 to the transmission lines 117 and 118.

Contact $A_1$ (FIGURE 14) also passes the voltage from the positive source 131 to a time delay circuit 132.

The voltage passed through contact $A_1$ is also passed through a normally closed contact $B_1$ to a pause solenoid 133 of the tape system which prevents the tape from moving for the time being, although the motor 134 has been started. After a two-seconds relay B is operated via the delay circuit 132. Contact $B_1$ disconnects the pause solenoid 133 so that the tape begins to move and contact $B_1$ also connects the voltage from the source 131 to a second time delay circuit 135, having a delay of about 30 seconds. The tape has recorded upon it an identification announcement lasting about fifteen seconds. After this announcement has been made a contact 136 is closed by a metallic section of the tape itself, which is formed by attaching a piece of metallic foil to the appropriate section of the tape in a known manner. The voltage from source 131 now passes through contact 136 and normally-closed contact $C_1$ to re-energize the pause solenoid 133, so that the tape is stopped. If, after a further fifteen seconds, no data is received by the system, i.e., the data detector 130 passes no voltage to a relay C over a line 138, a relay E is operated via the 30-second delay device 135. Contact $E_1$ operates relay C by passing a voltage from a positive source terminal 139 to the relay through a contact $D_2$ and normally-closed contact $E_2$ (FIGURE 13) opens and disconnects the tape transmission circuit from transformer 119.

The operation of changeover contact $C_1$ (FIGURE 14) releases the pause solenoid 133, so that the tape again begins to move, and contact $C_2$ completes a holding circuit for relay C so that it is locked on. The tape continues to move until the metallic section on the tape closes contact 137 and thereby energizes the relay D from the source 131 through contacts $A_1$ and $B_1$. Normally-closed contact $D_1$ opens and disconnects relay A and normally-closed contact $D_2$ opens and de-energizes relay C. In consequence, contacts $A_1$, $A_2$, $A_3$, $C_1$ and $C_2$ all return to their normal positions, thereby stopping the tape, switching off the tape drive motor 134, and disconnecting transformer 119 from the transmission wires. This is the sequence when no data is received.

If data is received during the second fifteen-second period a voltage from the data detector 129 is passed over line 138 and operates relay C immediately. In this case the sequence is as already described except that relay E is not operated so that the tape transmission equipment remains connected to the transmission lines. Consequently the acknowledgment message recorded on the second section of the tape is passed by transformer 119 on to the transmission lines 117, 118 instead of being blocked by the open contact $E_2$ (FIGURE 13).

If pay-tone is heard during the first two seconds of reception (indicating an incorrect call from a public call box) the pay-tone detector passes a voltage to a relay F (not shown) and relay F operates. This in turn causes the 2 seconds' delay circuit 132 to be replaced by a 12 seconds' delay circuit 141 so that relay B cannot be operated for a further 10 or more seconds. If, during this period, pay-tone ceases, contact $F_1$ replaces the 12 seconds' delay unit by the 2 seconds' delay unit so that relay B operates immediately and normal operation is resumed. If pay-tone continues to the end of the period (which would be an exceptionally unlikely condition in practice), relay B would operate and allow the opening announcement to be made irrespective of the pay-tone. Then the sequence would follow the "no data transmitted" sequence because it would be impossible to have both data and pay-tone on the transmission line at the same time. It should be realised that pay-tone could only occur in this system by accident as no transmitting station would ever be a public call box, and pay-tone only emanates from such calling stations. Thus, the incorporation of pay-tone facilities in the receiving apparatus is solely to satisfy the British Post Office requirements should someone in a public call box dial the number of the receiving apparatus by mistake.

If the transmitting station should transmit the data prematurely, e.g. if the human operator starts the transmitter before the identification message has ended, relay C operates due to the voltage developed by the data detector 129 so that contact 136 on the tape cannot operate the pause solenoid 133 (because contact $C_1$ is open) and the tape motion continues. The acknowledgment message is then transmitted immediately after the identification message without a pause and the sequences from the operation of contact 137 follows that previously described.

I claim:

1. A system for transmitting information from a plurality of separate transmitters over transmission channels to a central receiver comprising means in each transmitter to produce automatically in timed sequence a start pulse, a group of address pulses identifying the transmitter, and a group of information pulses, the central receiver comprising a number of information stores equal to the number of transmitters, each information store being identified with one transmitter, means responsive to the start pulse from a transmitter to cause the receiver to commence operation, means responsive to the address pulses to select the information store identified with the transmitter, and means to route the information pulses to the selected information store, each transmitter also comprising means to reduce the duration of each address and information pulse so that it is appreciably less than the time period allocated for the pulse, the pulse being transmitted in the centre of said time period, whereby a mismatch in the frequency of oscillators in any transmitter and in said receiver will not result in any loss of information, said pulses being produced in each transmitter by a transmitter astable multivibrator, each cycle of the multivibrator square wave defining one half of a time period, a series of transmitter bistable divider circuits connected in cascade, the first divider circuit being actuated by said multivibrator, a series of transmitter NOR circuits equal to the number of time periods required for the transmission sequence, and interconnections between said divider circuits and said NOR circuits whereby said NOR circuits produce pulses in progressive order in said successive time periods, each transmitter further comprising a modulator, a sine wave oscillator connected to said modulator, a first plurality of keys associated with a first plurality of said transmitter NOR circuits, said keys being permanently set to states corresponding with the address of the transmitter, said first plurality of keys when closed allowing pulses produced by said first plurality of said transmitter NOR circuits to pass to a common line, and a second plurality of keys associated with a second plurality of said transmitter NOR circuits, said second plurality of keys being set prior to a transmission according to the information to be transmitted at the subsequent transmission, the keys of said second plurality allowing pulses produced by said second plurality of NOR circuits to pass to said common line, said common line being connected to said modulator, whereby a burst of sinusoidal signals of uniform amplitude appears at the output of said modulator during the period of each pulse applied thereto from said common line.

2. A system as claimed in claim 1 in which said receiver comprises a diode pump circuit to which the received pulses from the transmission channel are applied, said diode pump circuit providing an output only after several cycles of the transmitted modulting frequency, whereby spurious operation of the receiver by noise and odd pulses in the transmission channel is prevented.

3. A system as claimed in claim 2 comprising a tuned amplifier in said receiver to which the input signals from said transmission line are applied, the tuned amplifier being tuned to said modulating frequency of the transmitter, the output of said tuned amplifier being applied to said diode pump circuit.

4. A system for transmitting information from a plurality of separate transmitters over transmission channels to a central receiver comprising means in each transmitter to produce automatically in timed sequence a start pulse, a group of address pulses identifying the transmitter, and a group of information pulses, the central receiver comprising a number of information stores equal to the number of transmitters, each information store being identified with one transmitter, means responsive to the start pulse from a transmitter to cause the receiver to commence operation, means responsive to the address pulses to select the information store identified with the transmitter, and means to route the information pulses to the selected information store, each transmitter also comprising means to reduce the duration of each address and information pulse so that it is appreciably less than the time period allocated for the pulse, the pulse being transmitted in the centre of said time period, whereby a mismatch in the frequency of oscillators in any transmitter and in said receiver will not result in any loss of information, said receiver also comprising a receiver multivibrator operating at substantially the same frequency as said transmitter multivibrator, a series of receiver bistable divider circuits connected in cascade, the first receiver divider circuit being actuated by said receiver multivibrator, a series of receiver NOR circuits equal to the number of time periods required for the receipt of pulses, interconnections between said receiver divider circuits and said receiver NOR circuits to produce pulses in progressive order in said successive time periods upon receipt by said receiver of pulses in the corresponding time periods, means connected to a first plurality of said receiver NOR circuits to define the address of an information store corresponding to the received address pulses, means associated with each store to cause it to respond to the definition of its address by said address defining means whereby the required information store is selected, and means in each of said information stores to accept and store information corresponding to pulses produced by a second plurality of said receiver NOR circuits in response to received information pulses, each information store comprising a number of relays equal to the number of possible information pulses, the pulse received by each NOR circuit associated with an information period being applied to the operating coil of a corresponding relay in each information store, and means to complete the return circuits of only those relays associated with the selected information store.

5. A system as claimed in claim 4 in which said relays have reset coils, and comprising means to reset the relays of the selected information store after the address thereof has been recognized and prior to the receipt of said information pulses.

6. A system as claimed in claim 5 in which each information store comprises a panel adapted to be illuminated in such a manner as to display the information received from the preceding transmission, and each relay in the store controls a lamp.

7. A system for transmitting information from a plurality of separate transmitters to a central receiver, each transmitter comprising a transmitter astable multivibrator, each cycle of the multivibrator square wave defining one half of a time period, a series of transmitter bistable divider circuits connected in cascade, the first transmitter divider circuit being actuated by said transmitter multivibrator, a plurality of transmitter NOR circuits equal to the number of time periods required for the transmission of pulses, interconnections between said transmitter divider circuits and said transmitter NOR circuits to provide that said transmitter NOR circuits produce pulses in progressive order in said successive time periods, said pulses including a start pulse, a plurality of address pulses corresponding to a unique address of the transmitter, a plurality of information pulses, and a stop pulse, an additional transmitter NOR circuit and further interconnections between one of said transmitter divider circuits and said transmitter NOR and additional NOR circuits to produce pulses shorter than said time periods and centrally disposed in time within said time periods, a first plurality of keys associated with a first plurality of said transmitter NOR circuits, said keys being permanently set to states corresponding with said unique address of the transmitter, said first plurality of keys when closed allowing pulses produced by said first plurality of transmitter NOR circuits to pass to a common line, a second plurality of keys associated with a second plurality of transmitter NOR circuits, the keys of said second plurality being settable according to the information to be transmitted, the keys of said second plurality when set allowing pulses produced by said second plurality of transmitter NOR circuits to pass to said common line, a modulator to which said common line is connected, a sine wave oscillator connected to said modulator, whereby the pulses produced by said first and second plurality of NOR circuits during said time periods consist of bursts of alternating current tone signals, transmission channels between said transmitters and central receiver by which said signals are transmitted to said central receiver, said central receiver comprising a receiver multivibrator operable at substantially the same frequency as the transmitter multivibrator, a bistable receiver initiating circuit having an initial state which starts the receiver multivibrator when changed to its other state upon receipt of a start pulse, a trigger circuit to provide said start pulse, said trigger circuit responding to the start pulse signal received from the transmitter to change said initiating circuit to its other state, a plurality of receiver bistable divider circuits connected in cascade, the first receiver divider circuit being actuated by said receiver multivibrator, a series of receiver NOR circuits equal to the number of time periods required for a complete transmission, interconnections between said receiver divider circuits and said receiver NOR circuits to produce pulses in progressive order in said successive time periods upon receipt of said address and information signals in said time periods by said receiver, a plurality of information stores each having an address corresponding to that of one of the transmitters, means connected to a first plurality of said receiver NOR circuits to define the address of an information store, means associated with each information store to cause it to respond to the production of its address by said first plurality of said NOR circuits in response to the received signals, whereby the required information store is selected, means whereby the selection of an information store produces interconnection between the selected information store and a second plurality of said NOR circuits, whereby pulses from said second plurality of NOR circuits produced in response to said received signals are routed to the selected information store, and means in each information store by which information corresponding to pulses received from said second plurality of receiver NOR circuits is accepted and stored.

References Cited

UNITED STATES PATENTS

| | | | |
|---|---|---|---|
| 2,584,739 | 2/1952 | Rees et al. | 178—50 |
| 2,885,659 | 5/1959 | Spielberg | 340—153 |
| 2,981,789 | 4/1961 | Wright et al. | 178—2 |

ROBERT L. GRIFFIN, *Primary Examiner.*

DAVID G. REDINBAUGH, *Examiner.*

W. S. FROMMER, *Assistant Examiner.*